United States Patent [19]
Link

[11] 3,725,701
[45] Apr. 3, 1973

[54] FLUORESCENT SOURCE NON-DISPERSIVE INFRARED GAS ANALYZER

[75] Inventor: William T. Link, Berkeley, Calif.

[73] Assignee: Andros Incorporated, Berkeley, Calif.

[22] Filed: Oct. 26, 1971

[21] Appl. No.: 192,602

Related U.S. Application Data

[63] Continuation-in-part of Ser. No. 859,326, Sept. 19, 1969, abandoned.

[52] U.S. Cl. .................................. 250/43.5, 250/83
[51] Int. Cl. ............................................. H01j 37/00
[58] Field of Search ................................. 250/43.5 R

[56] References Cited

UNITED STATES PATENTS

| | | | |
|---|---|---|---|
| 2,806,957 | 9/1957 | McDonald | 250/43.5 |
| 3,447,876 | 6/1969 | Barringer | 250/43.5 |
| 3,666,943 | 9/1968 | Carr-Brion et al. | 250/43.5 |

*Primary Examiner*—James W. Lawrence
*Assistant Examiner*—Harold A. Dixon
*Attorney*—Spensley, Horn and Lubitz

[57] ABSTRACT

A non-dispersive infrared gas analyzer utilizing a fluorescent source including a specific gaseous compound whose presence in an unknown gas mixture is to be detected and a container having infrared transparent portions. Fluorescent emission from the specific gaseous compound is stimulated by, for example, a black body infrared source. A sample cell retains an unknown gas mixture in a position to receive fluorescent emission so stimulated while a suitable detector or transducer detects energy absorption by the unknown gas mixture of substantially any portion of the fluorescent emission spectrum of the gaseous compound being detected. An additional stage of selectivity is obtained by inserting a fluorescent filter between the sample cell and the detector. A standard for comparison is provided by a two-channel gas analyzer utilizing a standard cell or normalizing cell in addition to the sample cell. A standard for comparison is also provided by including in the fluorescent source a gaseous compound and enriched quantities of one or more isotopes of the gaseous compound to provide different but nearby wave lengths. A variety of arrangements for signal chopping and for shielding the black body infrared source from the sample cell is included.

27 Claims, 26 Drawing Figures

FIG_1

FIG_2F

FIG_2G

FIG_2A

FIG_2H

FIG_2B

FIG_2C

FIG_2D

FIG_2I

FIG_2E

INVENTOR
WILLIAM T. LINK
BY
Townsend and Townsend
ATTORNEYS

FIG_3

FIG_4

FIG_7

FIG_5

FIG_6

FIG_8

FIG_9

FIG_10

FIG_11

FIG_12

FIG_13

FIG_14

FIG_14A

FIG_15

FIG_16

FIG_17

INVENTOR.
WILLIAM T. LINK

BY
Townsend and Townsend
ATTORNEYS

FLUORESCENT SOURCE NON-DISPERSIVE INFRARED GAS ANALYZER

This application is a continuation-in-part application of my co-pending application Ser. No. 859,326 filed Sept. 19, 1969, now abandoned.

This invention relates to a new and improved non-dispersive infrared gas analyzer for detecting the presence and concentration of a specified gaseous compound in an unknown gas mixture.

Conventional non-dispersive infrared gas analyzers generally consist of a black body infrared radiation source and one or more filters such as interference filters which pass a portion of the infrared spectrum. The filtered infrared radiation penetrates a measurement cell in which an unknown gas mixture or an unknown gas is contained. The radiation is selectively absorbed according to the characteristic absorption spectra of the unknown gasses or gas in the measurement cell. Radiation passing through the measurement cell falls upon a detector such as for example, a pneumatic cell. The pneumatic cell contains a quantity of the gas whose presence is sought to be detected in the unknown gas mixture and converts absorbed infrared radiation received in the pneumatic cell from the measurement cell into acoustic energy which can activate a diaphragm or microphone. The acoustic output of the pneumatic cell depends upon the level of radiation absorbed therein so that the output of the pneumatic cell is related inversely to the quantity of the gas sought to be detected in the unknown gas mixture. Two channel gas analyzers are also used in which the filtered infrared radiation is incident upon a sample cell and adjacent standard cell. Radiation passing through the sample cell and adjacent standard cell fall upon the two compartments of a pneumatic cell partitioned by a diaphragm and filled with a quantity of the gas being detected. The output of the pneumatic cell is therefore dependent upon the differential radiation absorption in the two compartments of the pneumatic cell.

These conventional arrangements yield very low selectivity and sensitivity and very low efficiency in addition to other disadvantages. Because conventional filters such as expensive interference filters are used to pass a desired region of the infrared spectrum from a black body infrared radiation source, the efficiency of the system is immediately reduced to a low level while undesired radiation still passes through the measurement cell and detector. The pneumatic cell must therefore be sealed from the atmosphere. Because the output of the conventional one channel gas analyzer is a small variation superimposed on a large signal, the output is particularly susceptible to losses at the optical interfaces through the device. Careful zero adjustment is necessary. Similarly, in the two channel gas analyzer, the output is a small variation or differential between two large signals, so that the output is particularly susceptible to errors produced by losses at the optical interfaces in either of the channels, and careful zeroing adjustments are essential.

It is therefore an object of the present invention to provide a new and improved non-dispersive infrared gas analyzer having significantly improved selectivity, sensitivity and efficiency.

Another object of the invention is to provide a self-zeroing gas analyzer whose output is generally insensitive to losses at the optical interfaces of the device.

A further object of the invention is to provide selective radiation sources and selective detectors for non-dispersive infrared gas analyzers.

In order to accomplish these results, the present invention contemplates providing a gas analyzer utilizing a fluorescent source including a gaseous compound to be detected in an unknown gas mixture and a container for the gaseous compound having infrared transparent portions. Fluorescent emission from the gaseous compound is stimulated by for example, a black body infrared radiation source. The broad band black body infrared radiation is absorbed by the gaseous compound only in its characteristic absorption wave lengths, thereafter re-emitting radiation only in the specific characteristic wave lengths of the gas whose presence is sought to be detected. According to the invention, a variety of infrared radiation source configurations are provided for stimulating fluorescent emission from the gaseous compound to utilize efficiently the stimulating radiation energy. A sample cell retains an unknown gas mixture in a position to receive fluorescent emission from the gaseous compound while a detector or transducer detects absorption by the unknown gas mixture of substantially any of the fluorescent emission spectrum of the gaseous compound being detected. A feature and advantage of this arrangement is that infrared radiation only in the characteristic absorption and emission spectrum of the gas whose presence and concentration is sought to be detected is permitted to pass into the sample cell and detector.

The invention also contemplates an additional stage of selectivity by providing a fluorescent filter between the sample cell and the detector. The fluorescent filter comprises a container filled with the gaseous compound to be detected and it is positioned to receive emissions passing through the sample cell. The detector is positioned outside the path of radiation passing through the sample cell and in a position to receive radiations re-emitted by the fluorescent filter. Undesirable frequencies are thereby further eliminated. The fluorescent detector can also be used with a conventional infrared gas analyzer to increase selectivity.

The invention contemplates a variety of detectors or transducers for detecting absorption by the unknown gas mixture of fluorescent emission from the stimulated gaseous compound whose presence and concentration is sought to be determined. Thus, in addition to pneumatic cells, solid state radiation detectors, and similar detectors, absorption can be detected by the change in temperature or pressure in the unknown gas mixture before and after exposure to the fluorescent emission. Furthermore, fluorescent emission from the gaseous compound of the fluorescent source can be stimulated in a variety of ways in addition to irradiation from a black body infrared source as for example by pressure excitation by heating and by electrical discharge.

In another embodiment, two channel gas analyzer is provided utilizing the fluorescent source arrangement and a standard cell or normalizing cell in addition to the sample cell in order to provide a standard for comparison.

According to another aspect of the invention, standards for comparison are provided by incorporating in the fluorescent source, in addition to the gaseous compound sought to be detected, one or more isotopes of the gaseous compound thereby providing different but nearby wavelengths. The gaseous compound and its isotope are combined to fluoresce from a single container through the sample cell while separate detector cells filled with the gaseous compound and its isotope, respectively, are provided. A chopper or alternator alternates impingement of the radiation passing through the sample cell onto the two detector cells. Or, separate fluorescent sources are provided, one containing the gaseous compound and the other containing the isotope with a chopper or alternator alternating the impingement of fluorescent emissions from the two fluorescent sources, respectively, onto the sample cell containing the unknown gas mixture. The detector cell following the sample cell then is filled with both the gaseous compound and its isotope. Additional isotopes can also be used. A feature and advantage of the incorporation of isotopes in the fluorescent source infrared gas analyzer contemplated by the present invention is the provision of a unique arrangement for detecting the presence and amount of high concentrations of carbon monoxide, and a unique detector for such a gas analyzer, comprising a pneumatic cell filled with an isotope such as by way of example, $C^{13}O^{16}$, in the case of carbon monoxide.

The invention further contemplates a variety of arrangements for signal chopping or alternating, for shielding or isolating the black body infrared radiation source from the sample cell and detector, and for providing fluorescent transport of stimulated gas to another location for fluorescent emission.

Other objects, features and advantages of the present invention will become apparent in the following specification and accompanying drawings.

FIGS. 2A through 2T are diagrammatic perspective views of a variety of configurations for stimulating fluorescent emission by one or more black body radiation sources.

FIG. 11 is a diagrammatic view showing a gas analyzer utilizing a gaseous compound and two different isotopes in the fluorescent source and fluorescent filters, while FIG. 12 is a graph of the output of the solid state detector.

FIG. 14 is a diagrammatic view of another gas analyzer incorporating an exciting source modulator for signal chopping, while

Figure 1:
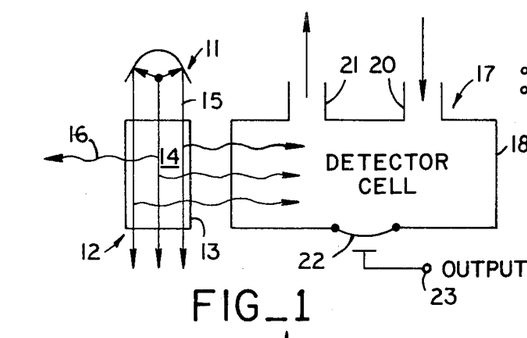
FIG. 1 is a diagrammatic view of the fluorescent source non-dispersive infrared gas analyzer.

In the embodiment of the present invention illustrated in FIG. 1, there is provided a conventional black body infrared radiation source 11 consisting of a heated element and a reflector. Radiation from the black body source 11 passes through the fluorescent source 12 consisting of a container 13 filled with the gaseous compound 14 whose presence and quantity is sought to be detected in an unknown gas mixture. The gaseous compound 14 absorbs from the broad band spectrum of the black body radiation the particular wavelengths or frequencies characteristic of the absorption spectrum of the gas and by fluorescent emission radiates the absorbed energy at its characteristic frequencies. By way of convention, in FIG. 1 and the remaining figures to be discussed hereinafter, the broad band emission from the black body infrared radiation source is indicated by straight arrows 15, while the fluorescent emissions from fluorescent source 12 are indicated by the wavy arrows 16.

Fluorescent emission 16 from fluorescent source 12 penetrates into a measurement cell 17 consisting of a container 18 filled with the unknown gas or unknown gas mixture. The unknown gas mixture can be passed through the measurement cell 17 through the inlet 20 and the outlet 21. The measurement cell 17 is at the same time a pneumatic cell incorporating a diaphragm or membrane 22 responsive to acoustic pressure generated by radiation by the unknown gas mixture, detected by a suitable transducer or microphone to provide at the output 23 a signal proportional to the amount of radiation absorbed in the pneumatic cell. Alternatively, element 22 could be a device for measuring the temperature rise of the unknown gas mixture, to provide at the output 23 a signal proportional to the amount of radiation absorbed in the pneumatic cell.

Because the fluorescent emission penetrating the pneumatic cell 17 is specific in frequency to the absorption spectrum of the gas whose presence is sought to be detected and contains no other frequency components, sealing of the measurement cell 17 is not critical and, indeed, the cell 17 can be open to the atmosphere.

Figure 2A:
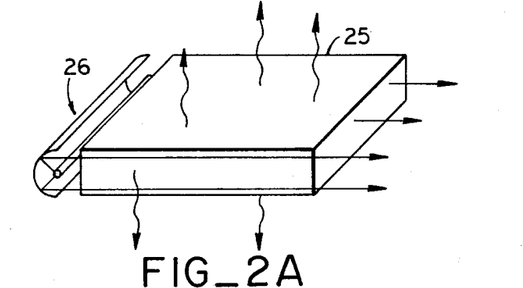
Figure 2B:
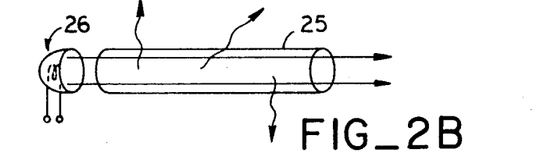
Figures 2C, 2D, 2I:
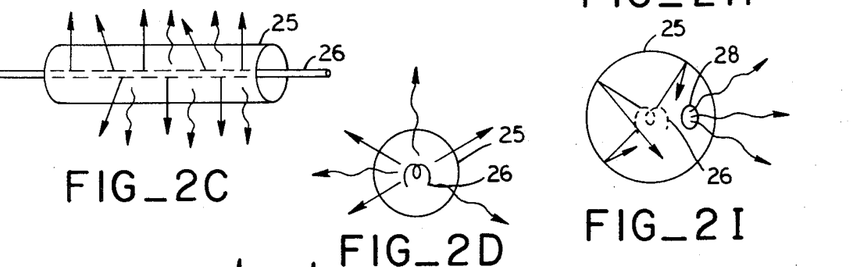

FIGS. 2A through 2I illustrate a variety of configurations for the black body radiation source and the fluorescent source for efficiently utilizing the energy of the black body source for stimulating fluorescent emission. In each of these diagrams, as in the remaining figures, straight arrows indicate broad band emission from the black body infrared radiation source, while wavy arrow indicate fluorescent emission from the fluorescent source. In each of these examples, the container for the gaseous compound is indicated by the numeral 25 while the infrared source or sources are indicated by the numeral 26. In FIGS. 2A and 2B, the containers 25 are a flat hexahedron and a cylinder, respectively, with infrared sources at one end for providing a single pass of the black body radiation through the container. The infrared sources consist of a heated element and a generally parabolic reflector. In FIG. 2c, the container 25 is cylindrical in shape and the infrared source 26 consists of an elongate heated element positioned coaxially within the container to provide a single pass of black body radiation radially outward through the cylinder. In FIG. 2D, the container 25 is spherical in shape, having an infrared source consisting of a heated element 26 at the center of the sphere to provide a single pass of black body radiation radially outwardly through the sphere. In FIG. 2A through 2D, each of the containers is formed of an infrared transparent material.

Figure 2E:
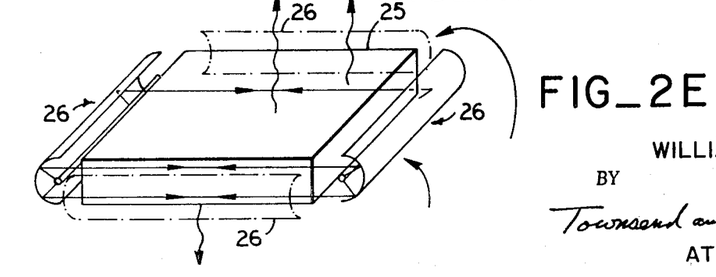
Figure 2F:
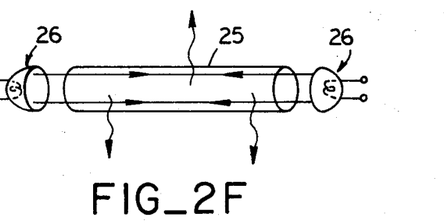

In FIGS. 2E and 2F, the container and infrared source are similar to those shown in FIGS. 2A and 2B, except that an infrared source is positioned at opposite ends of the containers 25 to permit multiple passes of the infrared radiation from sources 26 through the containers 25. Thus, each infrared source consists of a heated element and a parabolic reflector which reflects the radiation back and forth though the container.

Figure 2G:
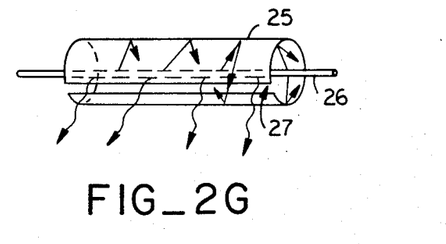

In FIG. 2G, the container consists of a cylinder similar to that illustrated in FIG. 2C with an infrared source in the form of an elongate heated element 26 coaxially centered within the cylinder. The cylinder container 25, however, is provided with an internally infrared reflective layer of a material such as for example gold, except for an infrared transparent slot formed along the cylinder to permit emergency of fluorescent emissions from the gas within the container. The internally reflective layer provides multiple passes of the black body infrared radiation from source 26 through the gas within the cylinder.

Figure 2H:
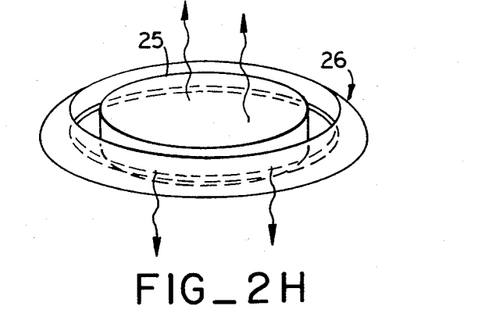

In the square shaped flat hexahedron of FIG. 2E, two pairs of infrared radiation sources could be provided on opposite sides to increase the stimulating radiation passing through the container and these sources are shown by broken lines in the figure. In FIG. 2H, the container 25 consists of a flat cylindrical section with a circular infrared radiation source circumscribing its entire perimeter. The infrared radiation source consists of a heating element in the form of a ring surrounded by a parabolic reflector also in the form of a ring to permit multiple passes of the black body infrared radiation energy through the container 25.

In FIG. 2I the container 25 is again of spherical shape similar to that shown in FIG. 2D having an infrared radiation source positioned internally and centrally of the sphere. However, the spherical container 25 is provided with an internally infrared reflective surface of a material such as gold, for example, except in the region of an infrared transparent hole 28 on the surface of the sphere to permit emergence of fluorescent emissions. The internally reflective surface permits multiple passes of the radiation from infrared source 26 through the gas in the container.

Figure 3:
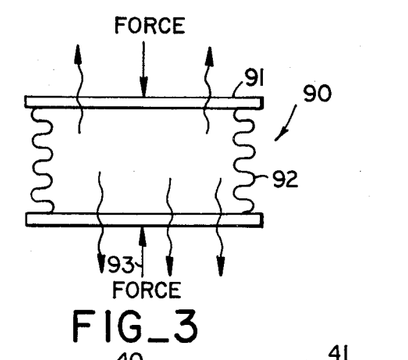
FIGS. 3 and 4 are diagrammatic views of alternatives for stimulating fluorescent emission by pressure excitation and electrical discharge, respectively.

Other expedients for stimulating fluorescent emission from the fluorescent source in addition to a black body infrared source can also be used. In the fluorescent source 90 shown in FIG. 3, the container 91 is provided with flexible side walls 92 to permit application of periodic forces 93 to produce pressure surges on the gas within the container. Such pressure surges are known to produce fluorescent emission and portions of the container wall of container 91 are infrared transparent to permit emergence of the infrared emissions.

Figure 4:
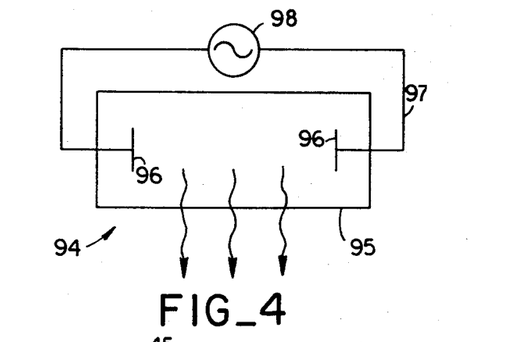

In the fluorescent source of FIG. 4, fluorescent emission from the gas within container 95 is stimulated by electrical discharge between electrodes 96 within the container, connected by an appropriate circuit 97 to an alternating electrical power source 98. Such alternating current can be over a wide range of frequencies, depending upon the gas being stimulated.

Figure 5:
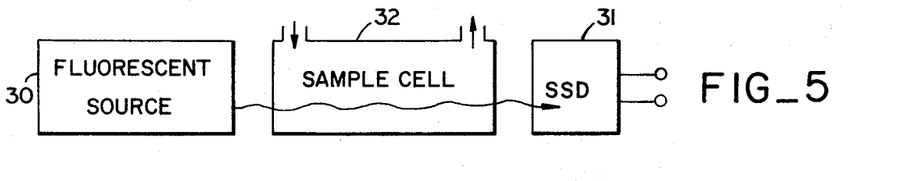
FIG. 5 is a diagrammatic view of a gas analyzer utilizing a solid state detector.

In the gas analyzer of FIG. 5, the basic fluorescent source 30 is utilized, fluorescent emission being stimulated by, for example, a black body infrared radiation source as heretofore described. Instead of the combined measurement and pneumatic cell shown in FIG. 1, however, the detector consists of a solid state radiation detector 31 positioned to receive radiation passing through a sample cell 32 in which the unknown gas or unknown gas mixture passes.

Figure 6:
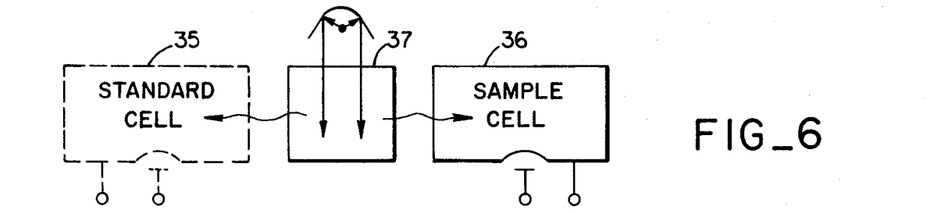
FIG. 6 is a diagrammatic view of a gas analyzer utilizing a first pneumatic cell serving both as a sample cell and detector and a second pneumatic cell serving as a standard cell and detector.

In FIG. 6, the gas analyzer of FIG. 1 is utilized in combination with a standard cell 35 filled with a known standard gas mixture. The cell 35 consists of both a measurement cell an pneumatic cell combined for detection of radiation and provides a standard for comparison with the absorption of radiation by combined sample cell and pneumatic cell 36. Fluorescent emission from fluorescent source 37 is stimulated in the manner heretofore described.

Figure 7:
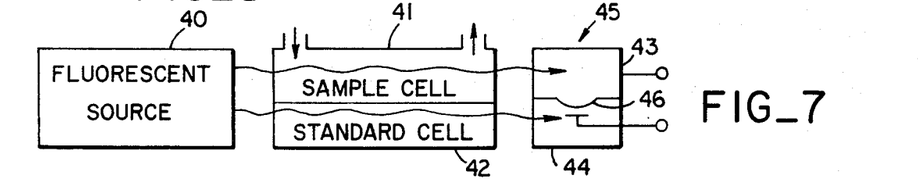
FIG. 7 is a diagrammatic view of a two channel gas analyzer utilizing a pneumatic cell.

A two channel fluorescent source gas analyzer is illustrated in FIG. 7. According to this embodiment of the invention, fluorescent emissions stimulated from fluorescent source 40 in the manner heretofore described pass through a sample cell 41 and adjacent standard cell 42. The unknown gas or gas mixture passes through sample cell 41 while a known standard gas mixture is retained within the sealed compartment of standard cell 42. Unabsorbed radiation passing through the sample cell and standard cell 41 and 42, respectively, penetrate adjacent compartments 43 and 44, respectively, of pneumatic cell 45. The adjacent compartments 43 and 44 are separated by a diaphragm 46 so that the output of pneumatic cell 45 consists of a signal proportional to the differential absorption by the gaseous compound within the compartments, that gaseous compound being the gas sought to be detected in the unknown gas mixture. A feature and advantage of this arrangement is that the output of pneumatic cell 45 is not a small variation or difference between two large signals, as in the conventional two channel gas analyzer, but is of substantial magnitude. Furthermore, the device represents substantial improvement over existing devices, for no radiations except the radiations specific to the unknown gas are present, and therefore zero drift and gas selectivity are improved.

Figure 8:
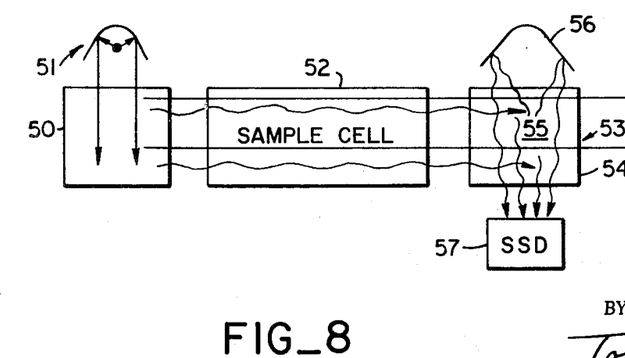
FIG. 8 is a diagrammatic view of a gas analyzer incorporating a fluorescent filter for additional selectivity.

In order to increase the selectivity and sensitivity of the fluorescent source non-dispersive infrared gas analyzer, a fluorescent detector is utilized in the gas analyzer of FIG. 8. In this embodiment of the invention, fluorescent emission stimulated from fluorescent source 50 by black body infrared radiation source 51 passes through sample cell 52. Unabsorbed radiation passing through sample cell 52, instead of penetrating a pneumatic cell or solid state detector enters a fluorescent filter 53 which consists of a container 54 filled with the gaseous compound 55 whose presence and concentration in the unknown gas mixture is to be determined. By means of this arrangement, radiation specific to the absorption spectrum of the gas whose presence is sought to be detected is absorbed in the fluorescent filter and re-emitted. The fluorescent re-emissions concentrated by parabolic mirror 56 impinge upon a solid state or other flat response radiation detector which thereby provides an accurate measure of the absorption by the unknown gas mixture in sample cell 52 of any radiation characteristic of the absorption spectrum of the gaseous compound sought to be detected. At the same time, undesirable broad band infrared radiation from contaminants or from reflection of radiation from infrared radiation source 51 pass directly through the fluorescent filter 55 so that they do not impinge upon the detector. Thus, detector 57 is positioned outside the path of radiation passing through sample cell 52 and is instead positioned to receive fluorescent re-emissions from fluorescent filter 53. Because detector 57 is sensitive to infrared radiation from a broad bend of frequencies, the presence and concentration of the gas is thereby identified by the entire frequency absorption and emission spectrum of the gas. The combination of the fluorescent filter and solid state detector 57, herein termed the fluorescent detector, identifies a gas by its entire "finger print" in the same manner as the combination of the fluorescent source and combined measurement an pneumatic cell of FIg. 1. The fluorescent detector of the present invention can therefor be used alone with the conventional infrared gas analyzers to increase selectivity, or in combination with the fluorescent source of the present invention to provide two stages of fluorescent "filtering." Since a fluorescent source 50 is also used in the embodiment of FIG. 8, two stages of "fluorescent selection" are provided, yielding a high degree of selectivity and sensitivity in the determination of gases.

The present invention is suitable for the detection of any and all gases that fluoresce. Most diatomic gases such as, for example, CO, NO, HCl, etc., and in fact probably all diatomic gases fluoresce. In addition, many simple polyatomic gases such as $CO_2$, $NO_2$, $SO_2$, $N_2O$, etc., fluoresce. In the following embodiments of the invention, reference is made to CO and its isotopes by way of example.

Figure 9:
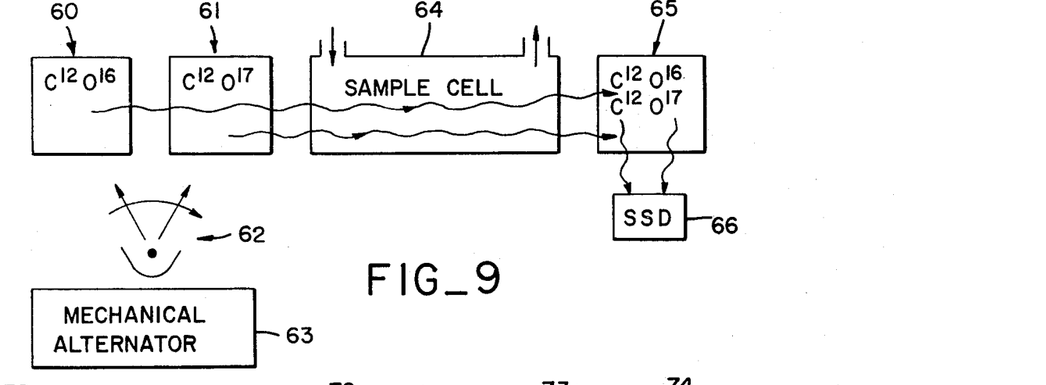
FIG. 9 is a diagrammatic view of a gas analyzer having two fluorescent sources, one the gaseous compound sought to be detected, and the other an isotope thereof.

In the gas analyzer illustrated in FIG. 9, a comparison standard is provided by including in the fluorescent source in addition to the gaseous compound to be detected, an isotope of the gaseous compound in enriched quantities to thereby provide fluorescent emission at different but nearby wavelengths. As shown in the embodiment of FIG. 9, two fluorescent sources 60 and 61 are provided. The first fluorescent source 60 consists of a separate container filled with the common isotope of carbon monoxide, $C^{12}O^{16}$, which has a natural abundance of approximately 99 percent. The second fluorescent source 61 consists of a container filled with the carbon monoxide isotope $C^{12}O^{17}$ which has a relative abundance of only $3.7 \times 10^{-4}$. The two fluorescent sources 60 and 61 are alternately stimulated by a black body infrared radiation source 62, the radiation from which is alternately directed to the fluorescent sources 60 and 61 by means of a mechanical alternator 63. The two fluorescent sources 60 and 61 are thereby alternately stimulated to fluorescent emission at different but adjacent frequency spectra. Fluorescent emissions pass through sample cell 64 through which the unknown gas mixture flows. Unabsorbed radiation passing through the sample cell penetrates a fluorescent filter 65 as heretofore described with reference to FIG. 8 except that the fluorescent filter 65 consists of a container filled with the common isotope of carbon monoxide, $C^{12}O^{16}$, and an enriched concentration of the isotope $C^{12}O^{17}$. Re-emissions from fluorescent filter 65 are detected and measured by detector 66 which may be, for example, a solid state detector which provides an output proportional to the radiation received and absorbed by the fluorescent filter 65 which is in turn proportional to the unabsorbed radiation passing through sample 64. Emissions from fluorescent source 61 generated by the $C^{12}O^{17}$ are absorbed on dirty sample cell walls in the same manner as the common isotope $C^{12}O^{16}$. However, because of the abundance of $C^{12}O^{17}$ is only $3.7 \times 10^{-4}$, the $C^{12}O^{17}$ fluorescence is only slightly absorbed in the sample gas. Thus, measurement of the absorption of radiation from sample cell 61 containing the isotope $C^{12}O^{17}$ provides a zero standard for comparison with the absorption of fluorescent emission from the fluorescent source 60 containing the common isotope $C^{12}O^{16}$. Because the frequency spectra of the two isotopes are different but closely adjacent, an accurate comparison standard is provided. The close frequency obtainable by use of the isotopes of the same compound minimizes the possibility for frequency-dependent absorption by contaminants in the apparatus. In other words, the closer the frequencies between the compared emissions, the less the effect of wavelength dependence of absorption and reflection co-efficients in the apparatus. Furthermore, expensive filters, such as interference filters are not required to produce the nearby wavelengths for comparison.

Figure 10:
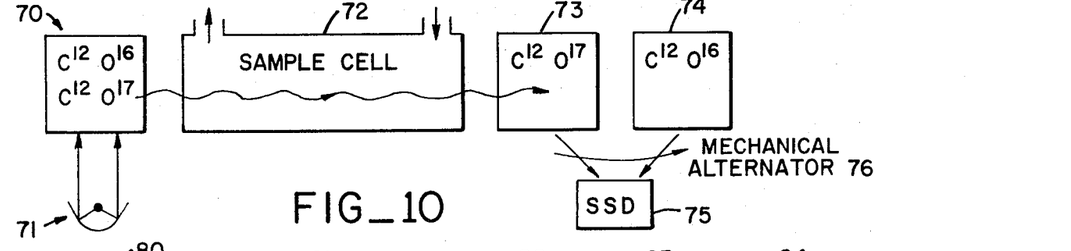
FIG. 10 is a diagrammatic view of another gas analyzer utilizing both a gaseous compound and its isotope.

Another arrangement for achieving the same results is shown in FIG. 10. According to this embodiment, a single fluorescent source 70 is provided consisting of a container filled with the common isotope of carbon monoxide, $C^{12}O^{16}$, and an enriched fraction of the isotope $C^{12}O^{17}$. The fluorescent source is stimulated to fluorescent emission by an infrared radiation source 71. Fluorescent emissions from source 70 pass through sample cell 72 in which the unknown gas mixture flows. Unabsorbed radiation passing through the sample cell 72 penetrates two fluorescent filters 73 and 74. Fluorescent filter 73 consists of a container filled with the isotope $C^{12}O^{17}$ while fluorescent filter 74 is filled with the common isotope $C^{12}O^{16}$. A detector 75 alternately receives re-emissions from fluorescent filters 73 and 74 to give output signals corresponding to the absorption of radiation in the respective filters. Impingement of re-emissions from filters 73 and 74 upon detector 75 are alternated by means of a mechanical alternator 76. Because the characteristic absorption band of $C^{12}O^{17}$ is only 26.6 $cm^{-1}$ away from that of $C^{12}O^{16}$, it provides an excellent comparison line.

Figures 11, 12:
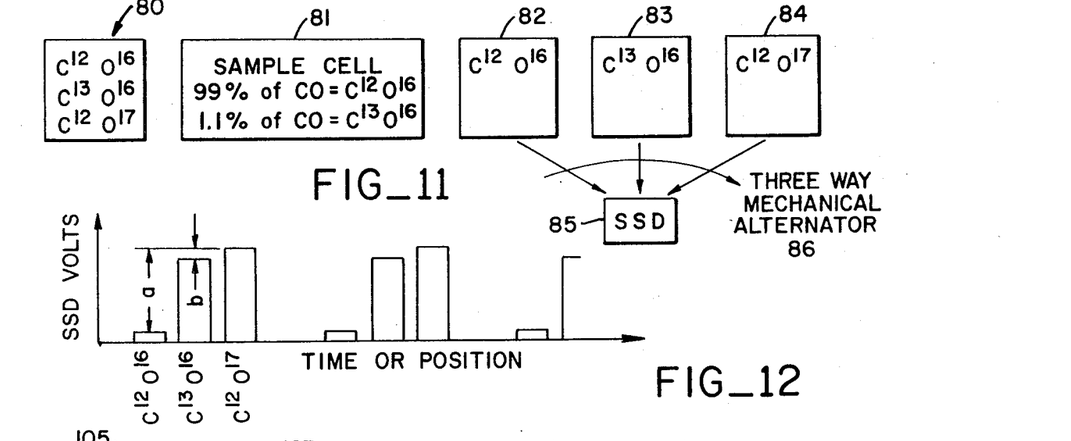

FIG. 11 diagrammatically illustrates a gas analyzer utilizing three isotopes of a gaseous compound, particularly suitable for the determination of gases having a number of stable isotopes such as carbon monoxide. The fluorescent source 80 consists of a container filled with three isotopes of carbon monoxide, namely $C^{12}O^{16}$, the common isotope, $C^{12}O^{17}$, referred to above, and $C^{13}O^{16}$, whose abundance is approximately one one-hundredths that of the common isotope $C^{12}O^{16}$. The fluorescent source is stimulated by, for example, and infrared radiation source not shown. Fluorescent emissions from the three isotopes of the fluorescent source pass through sample cell 81 where some of the radiation is absorbed. Radiation passing through sample cell 81 penetrates three fluorescent filters 82, 83 and 84 consisting of containers respectively filled with the three isotopes. Re-emissions from the fluorescent filters 82, 83 and 84 are alternately monitored by a detector 85 which is alternately positioned to receive the emissions from the three filters by means of a three-way mechanical alternator 86. FIG. 12 is a graph of the output from detector 85 for a sample cell 81 filled with pure carbon monoxide in its natural isotopic abundance. As shown in FIg. 12 with the scale exaggerated, the small signal at the solid state detector 85 for the $C^{12}O^{16}$ indicates a high absorption and the presence of approximately 99% $C^{12}O^{16}$. The greater signal for $C^{13}O^{16}$ indicates a relative abundance of approximately 1 percent, while the even greater signal for $C^{12}O^{17}$ indicates the presence of negligible amounts of that isotope.

For carbon monoxide gas analyzers and detectors, a variety of isotopes in addition to those referred to above is available. Such isotopes are set forth in Table I with certain characteristics compared, including approximate abundance; fractional deviation $\epsilon$, from the main absorption band of the common isotope $C^{12}O^{16}$; deviation in wave numbers from the main absorption band $\nu$ of the common isotope $C^{12}O^{16}$; and wave number $\nu$ of the main absorption band of each isotope, respectively.

The isotope $C^{13}O^{16}$ is particularly useful for providing an instrument with reduced sensitivity for detecting high concentrations of carbon monoxide. Thus, because the isotope $C^{13}O^{16}$ has an abundance approximately one one-hundredths that of the common isotope $C^{12}O^{16}$, use of the isotope $C^{13}O^{16}$ in the fluorescent detector or detector cell provides an instrument having its sensitivity to carbon monoxide reduced by a factor of 100. The isotope $C^{13}O^{16}$ can be used, to this end, in a pneumatic cell or in the fluorescent filter of a fluorescent detector.

TABLE I

| Isotopes | Approx. abundance | $\epsilon$ $\nu=\nu_o(1-\epsilon)$ | Approx. $\epsilon\nu_o$ (cm$^{-1}$) | $\nu$ (cm$^{-1}$) | Possible use |
|---|---|---|---|---|---|
| $C^{12}O^{16}$ | .99 | 0 | 0 | 2143.2 | Main line |
| $C^{12}O^{17}$ | $3.7\times10^{-4}$ | .0124 | 26.6 | 2116.6 | Comparison line, not absorbed by $C^{12}O^{16}$ |
| $C^{12}O^{18}$ | $2\times10^{-3}$ | .0248 | 53.2 | 2090.0 | Reduce instrument sensitivity |
| $C^{13}O^{16}$ | .011 | .0233 | 50.0 | 2093.2 | Reduce instrument sensitivity by 100 |
| $C^{13}O^{17}$ | $4.1\times10^{-6}$ | .0371 | 79.5 | 2063.7 | Comparison line |
| $C^{13}O^{18}$ | $2.2\times10^{-5}$ | .0503 | 107.8 | 2035.4 | Comparison line |

As previously stated, carbon monoxide has been used herein by way of example only, with the principles of the present invention also readily applicable to other gases. For instance, it will be noted from Table 1 that the carbon monoxide isotopes used may be any of the isotopes of CO formed from any combination of $C^{12}$ and $C^{13}$, and $O^{16}$, $O^{17}$, and $O^{18}$. Gas analyzers for measuring the presence of $CO_2$ may also be fabricated using isotopes of $CO_2$ formed from the above isotopes of carbon and oxygen, such as $C^{12}O_2^{16}$ as the common isotope, with enriched quantities of $C^{13}O_2^{16}$, $C^{13}O_2^{17}$, $C^{13}O_2^{18}{}^{12}O_2^{17}$, and $C^{12}O_2^{18}$, as well as such isotopes as $C^{12}O^{16}O$, $C^{12}O^{16}O^{18}$, etc. For NO, $NO_2$ and $N_2O$ detectors, the most common isotopes are $N^{14}O^{16}$, $N^{14}O_2^{16}$, and $N_2^{14}O^{16}$ respectively, with the other isotopes being formed by any other combination of the isotopes of $N^{14}$ and $N^{15}$ and $O^{16}$, $O^{17}$ and $O^{18}$. Thus for NO, the other isotopes may be $N^{14}O^{17}$, $N^{14}O^{18}$, $N^{15}O^{16}$, $N^{15}O^{17}$ or $N^{15}O^{18}$. For $NO_2$ the other isotopes may be $N^{14}O_2^{17}$, $N^{14}O_2^{18}{}^{15}O_2^{16}$, $N^{15}O_2^{17}$, and $N^{15}O_2^{18}$, as well as $N^{14}O^{16}O$, $N^{14}O^{16}O^{18}$, etc. For $N_2O$, the other isotopes may be $N_2^{14}O^{17}$, $N_2^{14}O^{18}$, $N_2^{15}O^{16}$, $N_2^{15}O^{17}$ and $N_2^{15}O^{18}$, as well as $N^{14}N^{15}O^{16}$, $N^{14}N^{15}O^{17}$, etc. For an $SO_2$ elector $S^{32}O_2^{16}$ is the most common isotope, with the other isotopes being formed by any combination of $S^{32}$, $S^{33}$, $S^{34}$ and $S^{36}$, and $O^{16}$, $O^{17}$ and $O^{18}$.

Figure 13:
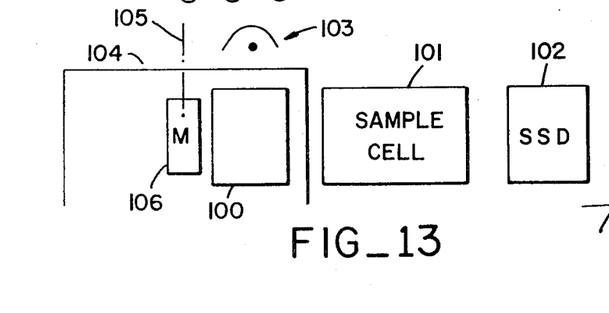
FIG. 13 is a diagrammatic view of gas analyzer incorporating a simple chopping mechanism.

In order to facilitate comparison of the absorption of neighboring wavelengths, and at the same time avoid the problem of DC drift in the detectors and "shine through" from the infrared source, it is advantageous to provide a means for signal chopping, i.e., alternating the output of the fluorescent source of modulating the fluorescent source by one of various means to provide a square wave output. FIG. 13 shows a gas analyzer of the type described above including a fluorescent source 100, sample cell 101 and flat response detector 102, such as a solid state detector. Fluorescent source 100 is stimulated to fluorescent emission by a black body infrared source 103 mounted above the fluorescent source. Positioned between fluorescent source 100 and infrared source 103 is a simple mechanical chopper 104 in the form of a hollow end section of a cylinder. The cylindrical end section 104 is mounted to rotate about its axis 105 driven by means of a motor 106. Holes are formed alternately in the top of the chopper and at the side of the chopper so that when radiation is permitted to pass from infrared source 103 to fluorescent source 100, fluorescent source 100 is blocked or shielded from sample 101. Thereafter, as chopper 104 rotates, infrared source 103 is blocked from fluorescent source 100 while fluorescent emission from fluorescent source 100 is permitted to pass through the sample cell 101.

Figure 14:
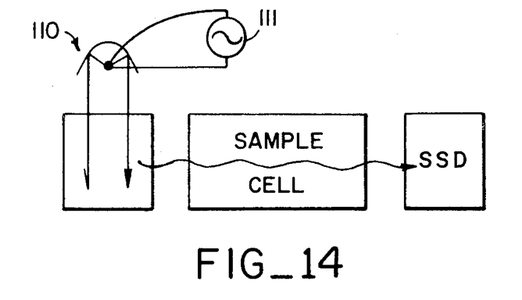
Figure 14A:
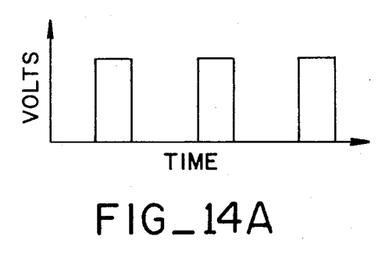
FIG. 14A is a graph of the square wave modulation of the power supply for the fluorescent source.

Chopping by means of modulation of the power supply to an infrared source 110 is shown in the gas analyzer of FIG. 14. According to this approach, the power supply 111 for generating radiation from infrared source 110 is square-wave modulated according to the graph shown in FIG. 14A.

Figure 15:
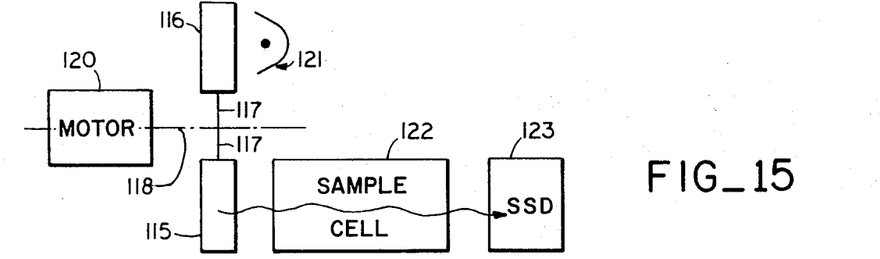
FIG. 15 is a diagrammatic view of a gas analyzer having a moving fluorescent source for signal chopping.

Yet another expedient for signal chopping is illustrated in FIG. 15. According to this embodiment, two or more fluorescent sources 115 and 116 are mounted on rods 117 radially extending from a common axis of rotation 118. The fluorescent sources are rotated about the axis by means of a motor 120. Infrared radiation source 121 for stimulating fluorescent emission is positioned adjacent the periphery of the circle traced by the rotating fluorescent sources 115 and 116 so that fluorescent emission is stimulated alternately in the fluorescent sources. Infrared source 121 is advantageously positioned so that radiation therefrom is directed away from sample cell 122 and detector 123 so that contamination by undesirable radiation is eliminated. Since the relaxation half-life of the fluorescence stimulated in carbon monoxide is approximately 0.03 seconds, the spacing of the infrared source 121 sample cell 122 and velocity of the fluorescent sources 115 and 116 must be appropriately adjusted. A stationary infrared reflective housing surrounding the fluorescent sources 115 and 116 substantially lengthens the effective fluorescent decay time, thus permitting a slower rotation rate.

Chopping can as easily be accomplished by mounting a plurality of florescent filters in the manner of the fluorescent sources illustrated in FIG. 15. Thus, the two fluorescent filters of FIG. 10 and three fluorescent filters of FIG. 11 can be mounted to rotate on radially extending arms alternately to receive radiation passing through the sample cells and alternately re-emit radiation onto the detector.

Figure 16:
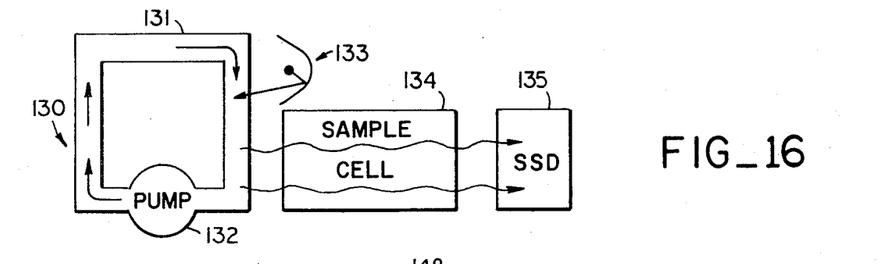
FIG. 16 is a diagrammatic view of a gas analyzer utilizing fluorescent transport of the stimulated gas in the fluorescent source.

In the gas analyzer illustrated in FIG. 16, the fluorescent source is arranged to provide "fluorescent transport," i.e., stimulation of the gas by infrared radiation at one location, and fluorescent decay of the stimulated gas at another location, with transport or flow of the gases from the first location to the second location. As shown in that figure, the fluorescent source 130 consists of a flow path 131 forming a closed loop within which a gaseous compound to be detected is confined. A pump 132 provides continuous flow of the gas around the flow path. Adjacent a first location along the flow path is an infrared radiation source 133 positioned to direct black body infrared radiation into the flow path of gas flowing around the closed loop. Positioned immediately downstream from the infrared source 133 at a second location along the flow path is a sample cell 134 in which an unknown gas or unknown gas mixture is contained. The apparatus is arranged so that gas molecules stimulated by infrared radiation from infrared source 133 decay by fluorescent emission so as to radiate into the sample cell 134. Unabsorbed radiation passes through to the detector 135 which is, for example, a solid state detector which provides a signal indicative of the radiation absorbed by the unknown gas mixture in sample cell 134. By the foregoing arrangement, the infrared source 133 is positioned so that radiation is directed away from the sample cell 134 and the detector 135 to prevent contamination by radiation of undesirable frequencies. The only radiation incident upon the sample cell 134 and detector 135 is that originating from the fluorescent emissions of the stimulated gas in container 131.

In order to prevent the loss of fluorescent emission by decay in the time required for transport of the stimulated gas from the first location adjacent infrared source 133 to the second location adjacent sample cell 134, portions of the container along the flow path between the first and second locations are coated with an infrared reflective material such as gold. By this expedient, the half-life or relaxation time of the stimulated gas can be effectively extended by a factor of 100 and greater. Fluorescent emission by decay from stimulate gas within the reflective regions of the flow path is reflected back into the gas where it is re-absorbed for subsequent reemission. This sequence may be repeated again and again, effectively retaining the energy within the flow path until it reaches the infrared transparent portions adjacent sample cell 134 through which the fluorescent emission emerges.

Figure 17:
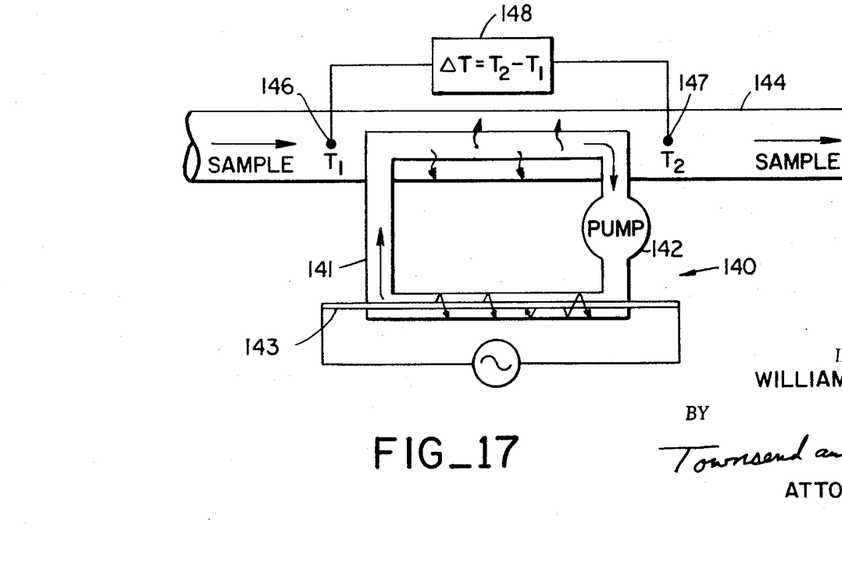
FIG. 17 is a diagrammatic view of a gas analyzer in which absorption of fluorescent emission by the unknown gas mixture is determined by measurement of the temperature before and after exposure to the fluorescent emission.

Application of such "fluorescent transport" in a gas analyzer designed to detect absorption of radiation by an unknown gas mixture by change in temperature is illustrated in FIG. 17. In this embodiment, the fluorescent source 140 consists of a container 141 in the form of a closed flow path in which the gaseous compound to be detected is confined. Continuous flow of the confined gas around the path is maintained by pump 142. Stimulation of fluorescent emission from the gaseous compound is accomplished by an infrared source consisting of an elongate radiating element rod 143 enclosed coaxially along one leg of the container flow path 141. Along this leg of the flow path, the container is coated internally with an infrared reflecting material such as gold to provide multiple passes of radiation from infrared source 143 through the gas flowing within the container. The stimulated gas is thereafter transported to another leg of the flow path where fluorescent emission from the gas penetrates a sample cell containing the unknown gas mixture.

In this case, the sample cell consists of a flow tube 144 through which the unknown gas or gas mixture passes. The leg of container 141 from which fluorescent emission from the stimulated gas originates is enclosed centrally within the flow tube 144 so that fluorescent emission from the stimulated gas is directed radially outwardly through the unknown gas mixture flowing through the tube 144. In order to prevent premature loss by fluorescent decay of the energy stored in the stimulated gas molecules, the portion of flow path 141 between the location of the infrared radiation source and the desired location of florescent emission, can be internally coated with an infrared reflecting material such as gold, thereby effectively extending the relaxation time or half-life of the stimulated gas molecules.

Detection of the absorption of fluorescent emissions by the unknown gas mixture passing though flow tube 144 is accomplished by measuring the temperature of the gas mixture before and after exposure to the fluorescent emissions. As shown in FIG. 17, a first temperature monitor 146 is positioned in the flow stream of the unknown gas mixture upstream from the fluorescent source. A second temperature monitor 147 is positioned in the unknown gas flow stream downstream from the fluorescent source. Appropriate circuitry 148 provides a readout signal proportional to the difference in temperatures monitored by the first and second temperature monitors 146 and 147. The difference in temperature is proportional to the absorption of fluorescent emission from the fluorescent source, which is in turn proportional to the presence of the specified gas in the unknown gas mixture. Alternatively, the radiating rod 143 and the flow path 141 may be arranged so that convection of the fluorescing gas produces a transport of fluorescent radiation from the vicinity of the radiating rod 143 to the sample tube 144, thus eliminating the necessity of the pump 142.

Detection of the extent of radiation absorption can also be achieved by measuring the change of pressure in the unknown gas mixture confined in a space, before and after irradiation.

I claim:

1. A gas analyzer comprising:
a fluorescent source including a gaseous compound to be detected in an unknown gas mixture, a first enriched isotope of said gaseous compound, a second enriched isotope of said gaseous compound and a container for said gaseous compound and isotopes having an infrared transparent portion;
means for stimulating fluorescent emission from said gaseous compound and said isotopes;
a sample cell for retaining an unknown gas mixture in a position to receive said fluorescent emissions;
and means for detecting absorption by the unknown gas mixture of fluorescent emissions from said gaseous compound, said first isotope and said second isotope respectively.

2. A gas analyzer as set forth in claim 1 wherein said gaseous compound comprises $C^{12}O^{16}$ and wherein said isotopes are different CO isotopes formed by carbon and oxygen isotopes selected from the group consisting of $C^{12}$, $C^{13}$, $O^{16}$, $O^{17}$ and $O^{18}$.

3. A gas analyzer as set forth in claim 1 wherein said gaseous compound comprises $C^{12}O_2^{16}$ and wherein said isotopes are different $CO_2$ isotopes formed by carbon and oxygen isotopes selected from the group consisting of $C^{12}$, $C^{13}$, $O^{16}$, $O^{17}$ and $O^{18}$.

4. A gas analyzer as set forth in claim 1 wherein said gaseous compound comprises $N^{14}O^{16}$ and wherein said isotopes are different NO isotopes formed by nitrogen and oxygen isotopes selected from the group consisting of $N^{14}$, $N^{15}$, $O^{16}$, $O^{17}$ and $O^{18}$.

5. A gas analyzer as set forth in claim 1 wherein said gaseous compound comprises $N^{14}O_2^{16}$ and wherein said isotopes are different $NO_2$ isotopes formed by nitrogen and oxygen isotopes selected from the group consisting of $N^{14}$, $N^{15}$, $O^{16}$, $O^{17}$ and $O^{18}$.

6. A gas analyzer as set forth in claim 1 wherein said gaseous compound comprises $N_2^{14}O^{16}$ and wherein said isotopes are different $N_2O$ isotopes formed by nitrogen and oxygen isotopes selected from the group consisting of $N^{14}$, $N^{15}$, $O^{16}$, $O^{17}$ and $O^{18}$.

7. A gas analyzer as set forth in claim 1 wherein said gaseous compound comprises $S^{32}O_2^{16}$ and wherein said isotopes are different $SO_2$ isotopes formed by sulphur and oxygen isotopes selected from the group consisting of $S^{32}$, $S^{33}$, $S^{34}$, $S^{36}$, $O^{16}$, $O^{17}$ and $O^{18}$.

8. In a non-dispersive infrared gas analyzer of the type in which absorption of selected infrared radiation by an unknown gas mixture in a sample cell is measured to determine the presence and amount of high concentrations of carbon monoxide, the improvement comprising:
a detector cell for detecting radiation passing through said sample cell comprising a pneumatic cell filled with $C^{13}O^{16}$.

9. A gas analyzer comprising:

a fluorescent source including a gaseous compound to be detected and a container for said gaseous compound having infrared transparent portions, said container defining a flow path between first and second locations, and means for transporting said gaseous compound from the first location to the second location;
an infrared radiation source portioned at said first location for stimulating said gaseous compound;
a sample cell positioned at said second location for retaining an unknown gas mixture in a position for receiving fluorescent emissions from said stimulated gaseous compound transported from the first location to the second location;
and means for detecting absorption of said fluorescent emissions by the unknown gas mixture.

10. A gas analyzer as set forth in claim 9 wherein the flow path of said container between the first and second locations is coated with infrared reflective material.

11. A gas analyzer comprising:
a fluorescent source including a gaseous compound to be detected in an unknown gas mixture, an enriched isotope of said gaseous compound and a single container for said gaseous compound and isotope having infrared transparent portions;
means for stimulating fluorescent emission from said gaseous compound and said isotope;
a sample cell for retaining an unknown gas mixture in a position to receive said fluorescent emissions;
and means for detecting and comparing absorption by the unknown gas mixture of fluorescent emissions from said gaseous compound and said isotope respectively.

12. A gas analyzer as set forth in claim 11 wherein said detecting and comparing means comprises a first cell filled with said gaseous compound and a second cell filled with said isotope, said first and second cells positioned to receive radiation passing through the sample cell, a radiation detector for receiving emissions, and means for alternating impingement onto said radiation detector of emissions from said first and second cells respectively.

13. A gas analyzer as set forth in claim 11 wherein said gaseous compound comprises $C^{12}O^{16}$ and wherein said isotope is a different CO isotope formed by carbon and oxygen isotopes selected from the group consisting of $C^{12}$, $C^{13}$, $O^{16}$, $O^{17}$ and $O^{18}$.

14. A gas analyzer as set forth in claim 11 wherein said gaseous compound comprises $C^{12}O_2^{16}$ and wherein said isotope is a different $CO_2$ isotope formed by carbon and oxygen isotopes selected from the group consisting of $C^{12}$, $C^{13}$, $O^{16}$, $O^{17}$ and $O^{18}$.

15. A gas analyzer as set forth in claim 11 wherein said gaseous compound comprises $N^{14}O^{16}$ and wherein said isotope is a different NO isotope formed by nitrogen and oxygen isotopes selected from the group consisting of $N^{14}$, $N^{15}$, $O^{16}$, $O^{17}$ and $O^{18}$.

16. A gas analyzer as set forth in claim 11 wherein said gaseous compound comprises $N^{14}O_2^{16}$ and wherein said isotope is a different $NO_2$ isotope formed by nitrogen and oxygen isotopes selected from the group consisting of $N^{14}$, $N^{15}$, $O^{16}$, $O^{17}$ and $O^{18}$.

17. A gas analyzer as set forth in claim 11 wherein said gaseous compound comprises $N_2^{14}O^{16}$ and wherein said isotope is a different $N_2O$ isotope formed by nitrogen and oxygen isotopes selected from the group consisting of $N^{14}$, $N^{15}$, $O^{16}$, $O^{17}$ and $O^{18}$.

18. A gas analyzer as set forth in claim 11 wherein said gaseous compound comprises $S^{32}O_2^{16}$ and wherein said isotope is a different $SO_2$ isotope formed by sulphur and oxygen isotopes selected from the group consisting of $S^{32}$, $S^{33}$, $S^{34}$, $S^{36}$, $O^{16}$, $O^{17}$ and $O^{18}$.

19. A gas analyzer comprising:
a fluorescent source comprising a gaseous compound whose presence is sought to be detected and a container for said gaseous compound having infrared transparent portions;
an infrared radiation source for stimulating fluorescent emission from said gaseous compound;
a sample cell for retaining an unknown gas mixture and for receiving fluorescent emissions from said fluorescent source;
means for continuously transporting stimulated gaseous compound to a position for fluorescent emission into the sample cell comprising a flow tube filled with said gaseous compound defining a closed path and means for creating a flow of gaseous compound around the closed path, said infrared source positioned at a location along the flow tube for directing stimulating radiation into the flow path, said sample cell positioned along the flow tube downstream from the infrared source for receiving fluorescent emission from the gaseous compound, said sample cell positioned outside the path of radiation from the infrared source; and
means detecting absorption of substantially any of the florescent emission spectrum of said gaseous compound by the unknown gas mixture.

20. In a non-dispensive infrared gas analyzer in which absorption of selected infrared radiation by an unknown gas mixture in a sample cell is measured to determine the presence and/or concentration of carbon monoxide, the improvement for detecting the presence and amount of high concentrations of carbon monoxide comprising:
a fluorescent detector for receiving radiation passing through said sample cell for detecting absorption by the unknown gas mixture of the selected infrared radiation comprising a fluorescent filter including a container having infrared transparent portions filled with the carbon monoxide isotope $C^{13}O^{16}$ and a radiation detector positioned outside the optical path of radiation passing through the sample cell to receive secondary molecular emissions from said fluorescent filter.

21. A gas analyzer comprising:
a fluorescent source comprising a gaseous compound to be detected and a container for said gaseous compound having infrared transparent portions;
an infrared radiation source for stimulating molecular fluorescent emission from said gaseous compound;
a sample cell for retaining an unknown gas mixture, said sample cell defining a flow tube exposed to fluorescent emission from said gaseous compound in a region along said tube and having a first temperature measurement means in said tube upstream from the exposed region and a second temperature measurement means in said tube downstream from the exposed region; and
means detecting absorption of said fluorescent emission by the unknown gas mixture by the change in temperature of the unknown gas mixture before and after exposure to the fluorescent emission.

22. A gas analyzer comprising:
a fluorescent source comprising a gaseous compound to be detected and a container for said gaseous compound having infrared transparent portions;
an infrared radiation source for stimulating molecular fluorescent emission from said gaseous compound;
a sample cell for retaining an unknown gas mixture and for receiving fluorescent emissions from said fluorescent source;
means for chopping stimulated fluorescent emission from the gaseous compound incident upon said sample cell, said chopping means having a plurality of containers filled with said gaseous compound having infrared transparent portions, said containers mounted on rods radially extending from a central axis, with motor means for rotating said rods and containers about said axis, said infrared radiation source being mounted adjacent the circular track described by said containers for stimulating the gaseous compound in said containers as said containers sequentially pass said radiation source; said sample cell being positioned to receive emission from the stimulated gaseous compound and also positioned outside the path of radiation from said infrared source; and
means detecting absorption of said fluorescent emission by the unknown gas mixture.

23. A gas analyzer comprising:
a fluorescent source comprising a gaseous compound whose presence is sought to be detected and a container for said gaseous compound having infrared transparent portions, said container having flexible side walls to permit application of periodic forces to produce pressure surges in said gaseous compound to stimulate fluorescent emission therefrom;
a sample cell for retaining an unknown gas mixture and for receiving fluorescent emissions from said fluorescent source; and
means detecting absorption of substantially any of the fluorescent emission spectrum of said gaseous compound by the unknown gas mixture.

24. A two channel gas analyzer comprising:
a fluorescent source including a gaseous compound to be detected in an unknown gas mixture and a container for said gaseous compound having infrared transparent portions, said container having flexible side walls to permit application of periodic forces to produce pressure surges in said gaseous compound to stimulate fluorescent emission therefrom;
a sample cell for retaining an unknown gas mixture in a position to receive said fluorescent emissions;
a standard cell for retaining a standard gas mixture in a position to receive said fluorescent emissions; and
means for measuring the differential absorption of said fluorescent emissions in said sample cell and standard cell.

25. In a non-dispersive infrared gas analyzer of the type in which absorption of selected infrared radiation by an unknown gas mixture in a sample cell is measured to determine the presence and/or concentration of a preselected gaseous compound the improvement comprising:

a fluorescent source for providing selected infrared radiation corresponding to the absorption spectrum of a gaseous compound to be detected including a container filed with said gaseous compound having infrared transparent portions, said container having flexible side walls to permit application of periodic forces to produce pressure surges in said gaseous compound to stimulate fluorescent emission therefrom.

26. A gas analyzer comprising:

a fluorescent source including a gaseous compound to be detected in an unknown gas mixture, an enriched isotope of said gaseous compound an a single container for said gaseous compound and isotope having infrared transparent portions, said container having flexible side walls to permit application of periodic forces to produce pressure surges in said gaseous compound and said enriched isotope to stimulate fluorescent emission therefrom;

a sample cell for retaining an unknown gas mixture in a position to receive said fluorescent emissions; and means for detecting and comparing absorption by the unknown gas mixture of fluorescent emissions from said gaseous compound and said isotope, respectively.

27. A gas analyzer comprising:

a fluorescent source comprising a gaseous compound to be detected and a container for said gaseous compound having infrared transparent portions, said container having flexible side walls to permit application of periodic forces to produce pressure surges in said gaseous compound to stimulate fluorescent emission therefrom;

a sample cell for retaining an unknown gas mixture and for receiving fluorescent emissions from said fluorescent source; and means detecting absorption of said fluorescent emission by the unknown gas mixture by the change in temperature of the unknown gas mixture before and after exposure to the fluorescent emission.

* * * * *